March 9, 1948.                I. J. EKSE                 2,437,512
       CIRCUMFERENTIALLY TRAVELLING ROLLER TYPE, SUPPORT
            MOUNTED, TIRE MOUNTING APPARATUS
              Filed Feb. 20, 1945        2 Sheets-Sheet 1
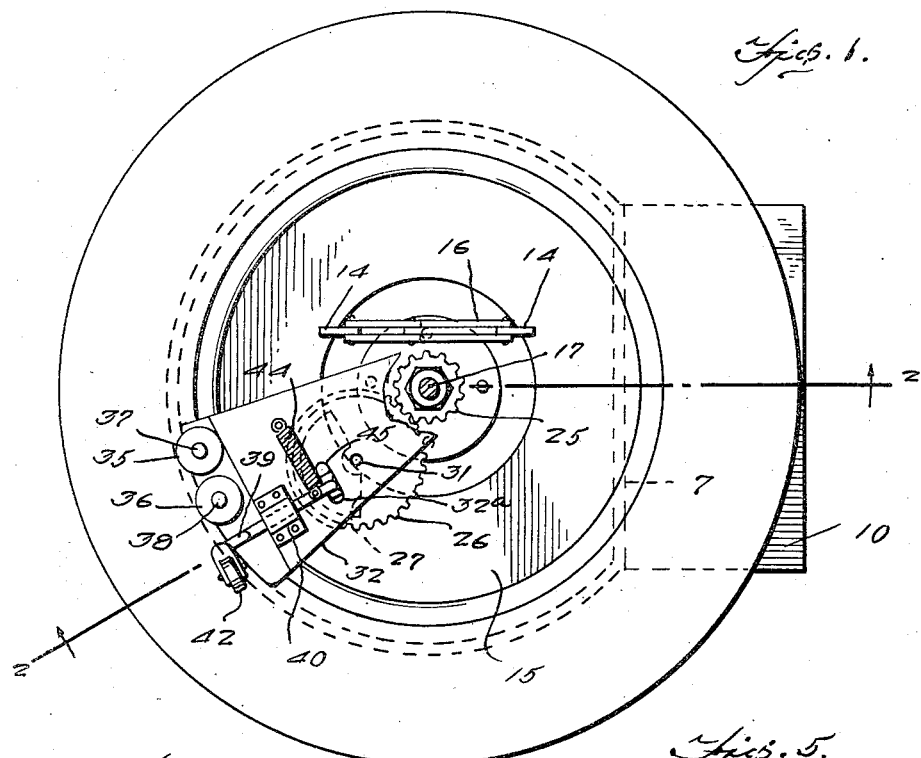
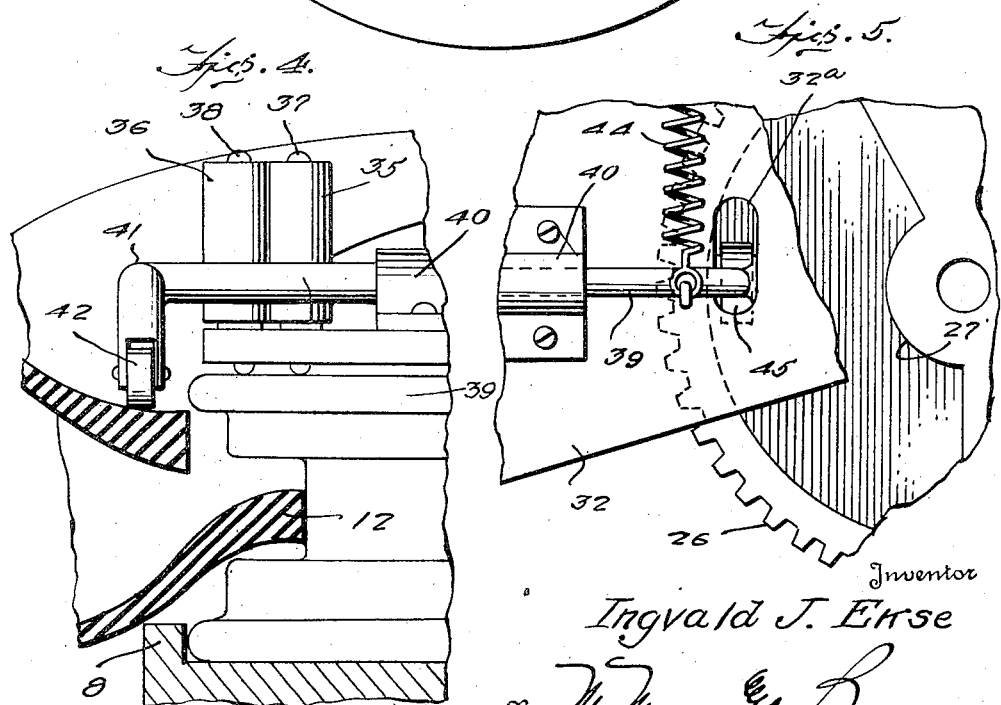
Inventor
Ingvald J. Ekse
By McMorrow & Berman
Attorneys

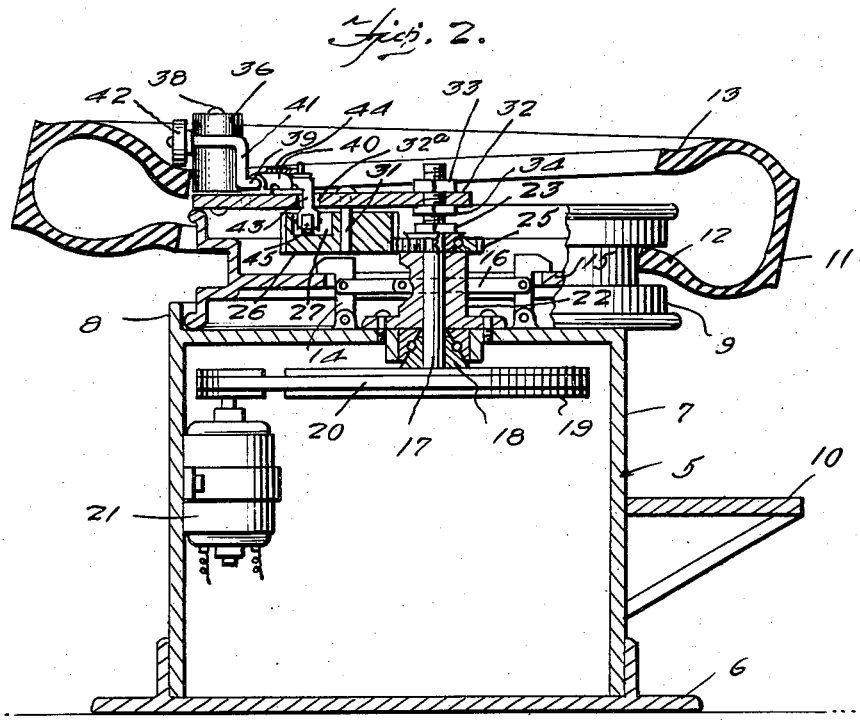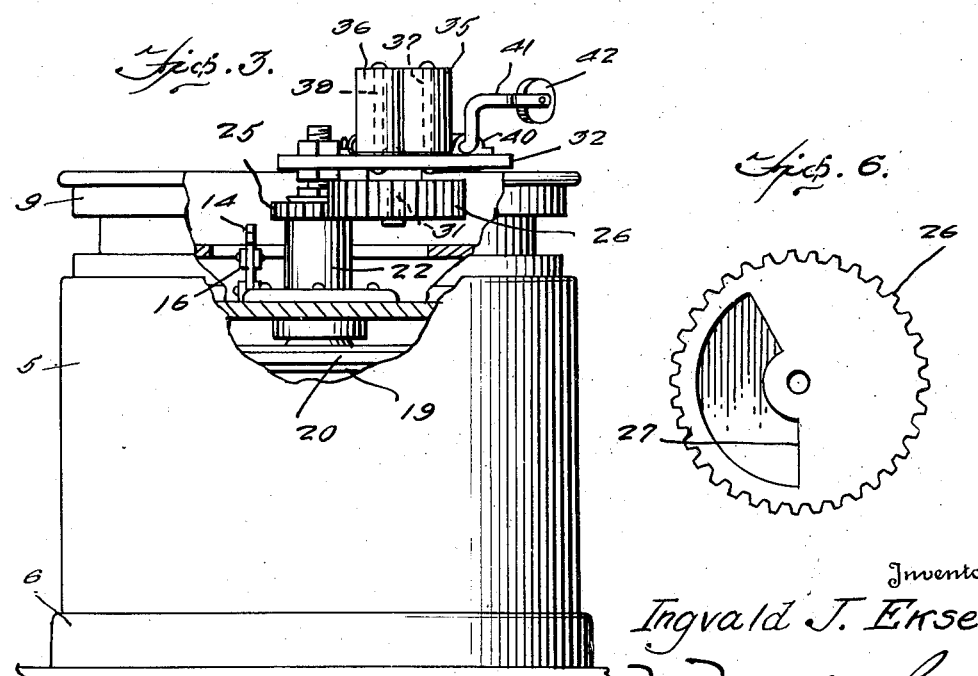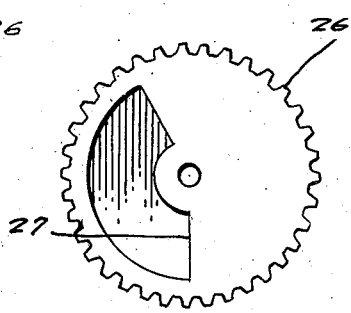

Patented Mar. 9, 1948

2,437,512

UNITED STATES PATENT OFFICE 2,437,512

CIRCUMFERENTIALLY TRAVELLING ROLLER TYPE, SUPPORT MOUNTED, TIRE MOUNTING APPARATUS

Ingvald J. Ekse, Minneapolis, Minn.

Application February 20, 1945, Serial No. 578,871

3 Claims. (Cl. 157—6)

The present invention relates to a new and useful improvement in apparatus for mounting pneumatic tires on a drop center rim and embodying mechanism adapted for engaging and expanding the beading of the tire together with means for simultaneously urging the beading downwardly on to the rim.

An important object of the present invention is to provide an apparatus of this character by means of which the tire beadings are mounted in position on the rim whereby to eliminate pinching or damaging of the inner tube while the tire is being mounted in position.

It is a common practice in mounting a pneumatic tire casing on a wheel rim to pound and beat the beading and side walls with a hammer or other tool, or by using the hands of a workman in forcing the tire in position and in many instances the beating of the tire casing with the hammer causes serious injuries thereto, or where the workman's hands are used to force the tire casing in position injury frequently occurs to the hands of the workman, and it is accordingly an object of the present invention to eliminate this objectionable practice and to provide simple and practical means for carrying out this purpose.

More specifically, the invention embodies a supporting structure on which a wheel rim is positioned and clamped against movement thereon together with a motor-driven rotatable mechanism including means for engaging the edge of the upper beading of the tire casing during a revolution of said mechanism to stretch the upper beading, and means in association with said mechanism and rotatable therewith adapted to travel in engagement with the side wall adjacent said upper beading of the tire casing upon a further revolution of the mechanism to thereby force the side wall downwardly and cooperate with the first-named means in completing the seating of the upper beading on the wheel rim.

By utilizing two revolutions of the rotatable mechanism, one for stretching the upper beading and the other for forcing the upper beading downwardly into seating relation on the wheel rim, the inner tube becomes properly seated on the wheel rim during the first revolution of the mechanism and is thus not in position to be pinched when the upper beading is forced downwardly during the second revolution of the mechanism, so that any likelihood of pinching of the tube during mounting of the tire on the wheel rim is substantially eliminated.

A further object of the invention is to provide an apparatus of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view.

Figure 2 is a vertical sectional view.

Figure 3 is a side elevational view with parts broken away and shown in section.

Figure 4 is a fragmentary enlarged vertical sectional view illustrating the manner of forcing the upper beading of the tire in position on the rim.

Figure 5 is an enlarged detail of the cam for moving one of the rollers into and out of tire engaging position, and Figure 6 is an enlarged top plan view of the gear showing the extent of the recess in the flat upper surface thereof constituting a portion of the cam.

Referring now to the drawings in detail, wherein for the purpose of illustration I have disclosed a preferred embodiment of the invention, the numeral 5 designated a supporting member which is preferably in the form of a drum supported on a base 6, the drum having one side flat as indicated at 7.

The upper edge of the drum is provided with an upstanding flange 8 except at its flattened side 7, the flange being interrupted at said flattened side of the drum. Positioned along the flattened side 7 at a point suitably spaced from the top of the drum and rigidly secured to said drum is a shelf or platform 10, said platform being for the purpose to be subsequently described.

A pair of upwardly projecting hook-shaped members 14, Figures 1 and 2, suitably spaced from each other are pivotally attached to the top of the drum 5 which are adapted to engage the disk portion 15 at diametrically opposed points of a drop center rim wheel 9 to thereby lock said wheel in position on the drum 5.

The hook members 14 are connected to each other by means of a sectional pivoted lever 16, said lever embodying two pivotally connected links, each link having an end pivotally attached to the complemental hook member 14. The hook members 14 and the lever 16 associated therewith constitute the means for releasably locking a drop center rim wheel 9 on which it is desired to mount a tire casing thereon in position on the drum 5. Movement of the pivoted links of the lever 16 upwardly and out of a position of straight alignment causes the hook members 14 to swing toward each other and out of engagement with the diametrically opposed points of the disk portion 15 of the drop center rim wheel 9, while movement of the pivoted links of the lever 16 downwardly and into a position of straight alignment causes the hook members 14 to move away from each other and into locking engagement with the diametrically opposed points of the disk portion 15 of the wheel.

A vertically extending shaft 17 is journaled in a bearing 18 carried by the under side of the top of the drum 5, the lower end of the shaft having a pulley 19 secured thereto and driven from a belt 20 from an electric motor 21 secured to the inside of the drum. The upper portion of this shaft is journaled in a bearing 22 attached to the upper face of the top of the drum.

An adjusting nut 23 is threaded on the upper end of the shaft to take up end play in the lower bearing 18 and upper bearing 22. Loosely mounted on the upper end of the shaft 17 and secured to the bearing 22 is a pinion 25 in meshing engagement with a gear 26. As shown in Figures 2 and 6, the flat upper surface of the gear 26 is provided with an arcuate recess 27 of an area less than half of its circumference, the flat upper surface and the recess 27 of the gear 26 constituting a cam, the flat surface portion forming the high part and the recess portion forming the low part thereof. The gear 26 is rotatably mounted on a pin 31 extending downwardly from and carried by the under side of an arm 32, said arm being secured to the upper threaded end of the shaft 17 by means of threaded nuts 33 and 34, the nut 33 bearing against the upper surface of the arm 32 and the nut 34 bearing against the lower or under surface thereof. Upon rotation of the shaft 17 arcuate movement in a horizontal plane is imparted to the arm 32, and the gear 26 rotatably carried on the lower face of the arm 32 rolls around the stationary pinion 25 and is thereby caused to rotate.

A pair of rollers 35 and 36 are journaled on the outer end of the arm 32 on upstanding pins 37 and 38, the roller 35 being in advance of the roller 36 with respect to the direction of rotation of the arm 32.

The rollers 35 and 36 are adapted to travel around the top edge of the beadings of the tire casing so as to force the beading outwardly and over the upper edge of the rim of the drop center wheel 9.

A horizontal shaft 39 is journaled in a bracket 40 on top of the arm 32, the outer end of the shaft 39 having an angular extension or crank 41 on which a roller 42 is journaled. The inner end of the shaft 39 is formed with a downwardly extending crank arm 43 having its lower end projecting through an opening 32a in the arm 32 and provided with a roller or wheel 45 adapted to travel upon the flat upper surface and in the recess 27 of the gear 26 constituting the cam. The crank arm 43 is yieldably urged into its downwardly extended position by means of a coil spring 44 connecting the upper portion of the crank arm with the plate 32.

In the operation of the device, the operator exerts an upward pull upon the pivoted links of the lever 16, to thereby cause the hook members 14 to swing toward each other and out of locking position. A drop center rim wheel on which it is desired to mount a tire casing is then placed on the drum 5. For the mounting of the wheel it is a prerequisite that the rollers 35 and 36, wheel 42, and arm 32 be in a position adjacent or nearest to the operator. The mounting of a wheel on the drum is done by the operator lifting the wheel to a tilted position and while in such position passing the rollers 35 and 36 and wheel 42 through the central opening in the disk portion 15 of the wheel. As soon as the wheel has been advanced so that the central opening is free of this roller and wheel mechanism, the operator permits the portion adjacent his body to drop while still maintaining the wheel in a tilted position until it contacts the top of the drum 5. At this point, the operator pulls the wheel toward him until the peripheral edge of the lower rim of the wheel is in engagement with the flange 8, whereupon the opposite tilted portion of the wheel is allowed to drop into position on the top of the drum 5. With the wheel thus positioned on the drum, the operator exerts a downwardly directed force upon the pivoted links of the lever 16 to thereby cause the hook members 14 to move away from each other and into locking engagement with the diametrically opposed points of the disk portion 15 of the wheel.

With the drop center rim wheel thus positioned and locked on the drum 5, a tire casing having an inner tube therein is then placed in juxtaposition with respect to the wheel with the valve stem of the tube either pointing to the valve opening in the wheel rim or inserted therein. This is effected by the operator placing the tire casing over the rim so as to clear the rollers 35 and 36, wheel 42, and arm 32, and then permitting the portion of the casing adjacent the body of the operator to drop downwardly until the lower beading 12 of the casing is contiguous to the drop center of the wheel rim. At this point the operator exerts a transverse force in the direction away from his body on the casing until the lower beading 12 thereof is in engagement with the drop center portion of the rim of the wheel and the upper beading 13 rests on the top of the wheel rim, as shown in Figure 2. With the portion of the lower beading 12 of the casing adjacent the body of the operator in position such that it is in contact with the complemental portion of the drop center of the wheel rim or the position shown in Figure 2, the operator, while maintaining the casing in a slightly tilted position, next exerts a downwardly-directed transverse pull on the portion of the casing remote from his body, until the upper beading of the casing is drawn into a position such that the wheel 42 is in superimposed relation with respect to the side of the casing adjacent the upper beading 13, as shown in Figure 2.

With the wheel 9 thus mounted on the drum 5 the motor 21 is actuated, thereby causing the rotation of the shaft 17, gear 26, and arm 32. It is to be noted that the ratio of the pinion 25 and gear 26 is such that the arm 32 will make two complete revolutions to one complete revolution of the gear 26 and its cam comprising the flat upper surface and the recess 27 therein. During the first revolution of the arm 32 the forwardly arranged roller 35, in cooperation with the rearwardly arranged roller 36, exerts a laterally or outwardly directed pull or stretch upon the upper beading 13 and rolls such beading over the edge of the wheel rim. At the start of the first revolution of the arm 32 and during most of such revolution, the roller 45 is traveling through the low part of the cam or the recess 27, Figure 6, on gear 26. At a point close to the completion of the first revolution of the arm 32 the roller 45 begins to travel along the high part of the cam or the upper flat surface of gear 26. With the initiation of the travel of the roller 45 along the high part of the cam, the wheel 42 is lowered and thereby caused to exert downwardly-directed pressure on the side of the upper beading 13 of the casing through the intermediacy of the shaft 39 and crank arm 43 in opposition to the spring 44, thereby pushing down the upper beading in line with the wheel rim. When the arm 32 has completed about two-thirds of its second revolution, the upper beading 13 will be in place over the wheel rim, and the tire casing is mounted in place on the wheel rim. Upon the completion of the second revolution of the arm 32, the roller 45 enters the low part of the cam or the recess 27 of the gear 26, resulting in the return of the wheel 42 to its upper position and the crank arm 43 into its downwardly-extended position under the retraction of the coil spring 44. With the termination of the second revolution of the arm 32, the operator stops the actuation of the motor 21.

With the stopping of the motor, the operator exerts an upward pull upon the pivoted links of the lever 16, to thereby cause the hook members 14 to swing toward each other and out of locking position with respect to the rim portion 15 of the wheel 9. Upon release of the wheel having the tire casing and inner tube mounted thereon from the drum 5, the operator grasps the portion of the tire casing directly opposite from the position in which he is standing, and then tilts the wheel upwardly while drawing it toward him. As the wheel is initially tilted, the tire casing thereon is brought into position to rest upon and be supported by the shelf or platform 10, and the wheel is then further tilted to free it from the rollers 35 and 36, wheel 42, and arm 32, and to bring it to a vertical position on the shelf or platform 10 from whence it may be removed for conveyance to either a place of storage or use.

It is believed that the details of construction, operation and advantages of the device will readily be understood from the foregoing without further detailed explanation.

What I claim is:

1. A tire mounting apparatus comprising a horizontal support for a wheel having a tire with its lower beading partially seated on the rim of said wheel, rotatable mechanism carried by said support including means for engaging the edge of the upper beading of said tire during a revolution of said mechanism to stretch the upper beading, normally ineffective means in association with said mechanism and rotatable therewith adapted to travel over the side wall adjacent said upper beading of said tire, and means for automatically rendering said second-named means effective during a further revolution of said rotatable mechanism, to thereby force said side wall downwardly and cooperate with said first-named means in completing the seating of the said upper beading on said rim.

2. A tire mounting apparatus comprising a horizontal support for a wheel having a tire with its lower beading partially seated on the rim of said wheel, rotatable mechanism carried by said support including means embodying a pair of rollers spaced from each other in the direction of rotation of said mechanism for engaging the edge of the upper beading of said tire during a revolution of said mechanism to stretch the upper beading, normally ineffective means in association with said mechanism and rotatable therewith adapted to travel over the side wall adjacent said upper beading of said tire, and cam means automatically responsive to the rotation of said rotatable mechanism for rendering said second-named means effective during a further revolution of said rotatable mechanism, to thereby force said side wall downwardly and cooperate with said first-named means in completing the seating of said upper beading on said rim.

3. A tire mounting apparatus comprising a horizontal support for a wheel having a tire with its lower beading partially seated on the rim of said wheel, a rotatable shaft on said support, an arm secured to said shaft and rotatable therewith, roller means carried by the outer end of said arm for engaging the edge of the upper beading of said tire during a revolution of said arm and shaft to stretch the upper beading, a rockably mounted shaft journaled on said arm, a wheel journaled on said last-named shaft and movable upon rocking of said shaft into position to engage the side wall adjacent the upper beading of said tire, and means controlled by said first shaft and operatively connected to said last-named shaft for rocking the latter shaft to move said wheel into position to engage said side wall during a further revolution of said first shaft to thereby force said side wall downwardly and in cooperation with said roller means to complete the seating of said upper beading on said rim.

INGVALD J. EKSE.

REFERENCES CITED

The following references are of record in the file of this patent:

UNITED STATES PATENTS

| Number | Name | Date |
| --- | --- | --- |
| 616,967 | Prescott | Jan. 3, 1899 |
| 1,352,550 | Singleton | Sept. 14, 1920 |
| 1,416,094 | Krauska | May 16, 1922 |
| 1,538,875 | Stevens | May 19, 1925 |
| 1,587,634 | Dickey et al. | June 8, 1926 |
| 2,034,819 | Maulis | Mar. 24, 1936 |

FOREIGN PATENTS

| Number | Country | Date |
| --- | --- | --- |
| 492,250 | France | Mar. 11, 1919 |